United States Patent
Dry et al.

(10) Patent No.: US 7,235,200 B2
(45) Date of Patent: Jun. 26, 2007

(54) FOAMED CORE PROCESS FOR LARGE CROSS-SECTIONS OF GRAB HANDLES

(75) Inventors: Alan G. Dry, Auburn Hills, MI (US); Eroc Mozer, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 236 days.

(21) Appl. No.: 10/605,576

(22) Filed: Oct. 9, 2003

(65) Prior Publication Data

US 2005/0079336 A1    Apr. 14, 2005

(51) Int. Cl.
  *B29C 39/10* (2006.01)
  *B29C 44/02* (2006.01)

(52) U.S. Cl. .................... 264/51; 264/154; 264/250; 264/275

(58) Field of Classification Search .......... 264/51, 264/46.7, 156, 278, 154, 250, 275; 156/245
  See application file for complete search history.

(56) References Cited

U.S. PATENT DOCUMENTS

| | | | |
|---|---|---|---|
| 3,906,066 A * | 9/1975 | Barrie ........................ 264/45.5 |
| 4,165,898 A | 8/1979 | Janz | |
| 4,850,209 A * | 7/1989 | Weinerman et al. .......... 70/208 |
| 5,037,687 A | 8/1991 | Kargarzadeh | |
| 5,298,306 A * | 3/1994 | Miller ......................... 428/68 |
| 5,306,540 A | 4/1994 | Hayashi | |
| 5,308,574 A * | 5/1994 | Yamazaki et al. ........... 264/572 |
| 5,328,651 A | 7/1994 | Gallagher | |
| 5,501,120 A | 3/1996 | Kikuchi | |
| 5,679,301 A | 10/1997 | Miklas | |
| 5,868,455 A * | 2/1999 | Springer et al. .......... 296/146.1 |
| 5,920,943 A * | 7/1999 | Barker ....................... 15/143.1 |
| 5,931,525 A * | 8/1999 | Rickabus .................... 296/214 |
| 6,037,038 A | 3/2000 | Kuhr | |
| 6,349,450 B1 * | 2/2002 | Koops et al. ............. 292/336.3 |
| 6,409,249 B1 * | 6/2002 | Han ......................... 296/146.7 |
| 6,892,496 B1 * | 5/2005 | Youngs et al. ................ 49/506 |
| 2002/0053750 A1 | 5/2002 | Schwaighofer | |
| 2002/0070484 A1 | 6/2002 | Davis, Jr. | |
| 2003/0041955 A1 | 3/2003 | Spengler | |

FOREIGN PATENT DOCUMENTS

| | | |
|---|---|---|
| DE | 9214773 U1 | 12/1992 |
| DE | 19546397 A1 | 6/1997 |
| DE | 19641134 A1 | 4/1998 |
| DE | 10019605 A1 | 10/2001 |
| DE | 10204168 A1 | 8/2003 |
| JP | 9220767 | 8/1997 |

* cited by examiner

*Primary Examiner*—Allan R. Kuhns
(74) *Attorney, Agent, or Firm*—Earl LaFontaine, Esq.

(57) ABSTRACT

A plastic product for particular use as grab handles, door closure handles, and other trim and component products. A foam core, either structural or non-structural, is over-molded with a hard or soft plastic shell or skin. Structural members for heat staking, mechanical fastenings, and the like, are integrally formed on the ends of the handles in order to affix the handles to a door pillar, door panel, or the like.

7 Claims, 3 Drawing Sheets

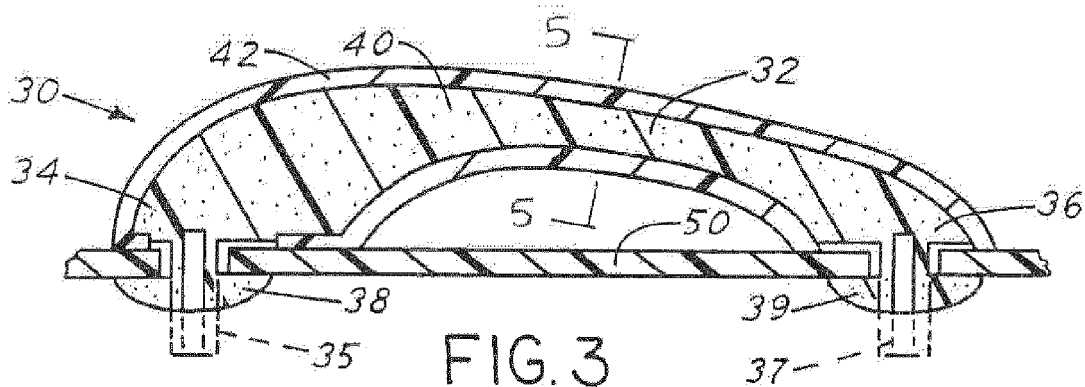
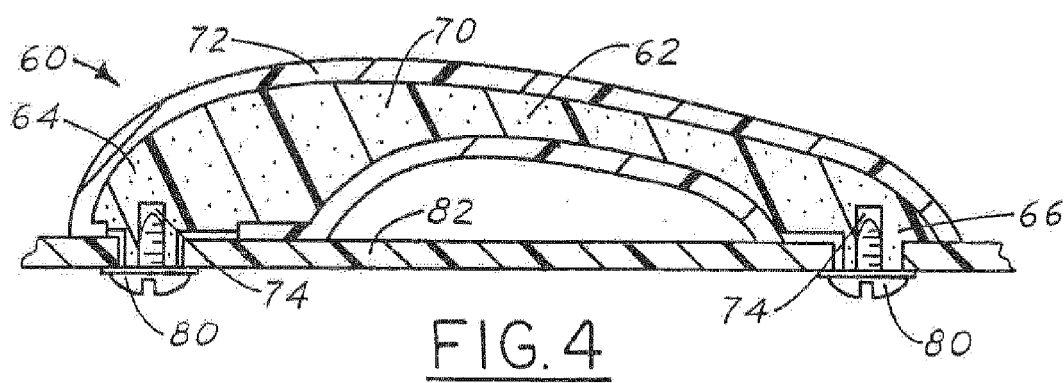
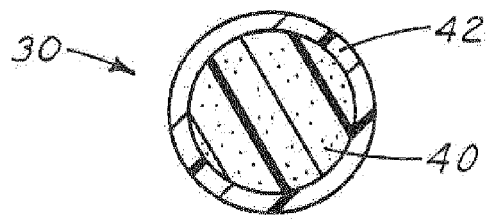
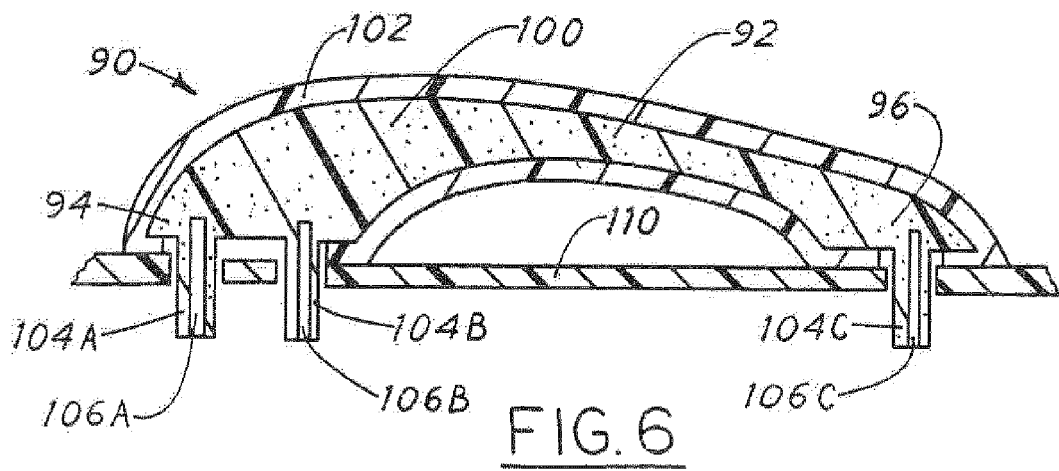

FOAMED CORE PROCESS FOR LARGE CROSS-SECTIONS OF GRAB HANDLES

BACKGROUND OF INVENTION

The present invention relates to the manufacture of plastic handles for automobiles and other vehicles, and more particularly to plastic handles with a foam core.

There are numerous components for automobiles and other vehicles that are made out of plastic, such as door closure handles, grab handles, and other trim and component parts. Most of these plastic components are made from a plastic injection molding process and some, in particular, are made using a gas-assisted plastic injection molding process. Solid plastic injection molded components are typically difficult to manufacture, and utilize excess material, excess cycle time, and create excess manufacturing costs and expenses. Gas-assisted injection molding processes can be an improvement for certain components, such as door closure handles and grab handles, but such processes have their own deficiencies and drawbacks, including additional costs and manufacturing variabilities.

For certain plastic components, such as door closure handles and grab handles, it is necessary to have a product which is structurally sound and durable. At the same time it is beneficial to provide a product which is easy to manufacture, lightweight, and has a less expensive manufacturing cost.

SUMMARY OF INVENTION

It is an object of the present invention to provide an improved plastic product, which is particularly useful for door closure handles and grab handles for automobiles and other vehicles. It is also an object of the present invention to provide an improved process for the manufacture of plastic components, such as door closure handles and grab handles.

It is a further object of the present invention to provide a plastic injection molding process that does not have any of the additional expenses or manufacturing variabilities of gas-assisted injection molding processes. It is a still further object of the present invention to provide an improved process and product for use in the automobile industry that is less expensive than existing processes and products and which eliminates the high scrap rate of gas assist and eliminates all of the gas assist equipment, running and tooling costs.

BRIEF DESCRIPTION OF DRAWINGS

FIG. 3 illustrates a first embodiment of the present invention.

FIG. 4 illustrates a second embodiment of the present invention.

FIG. 5 is a cross-sectional view of the present invention taken along lines 5—5 in FIG. 3.

FIG. 6 illustrates a third embodiment of the present invention.

DETAILED DESCRIPTION

Figure 1:
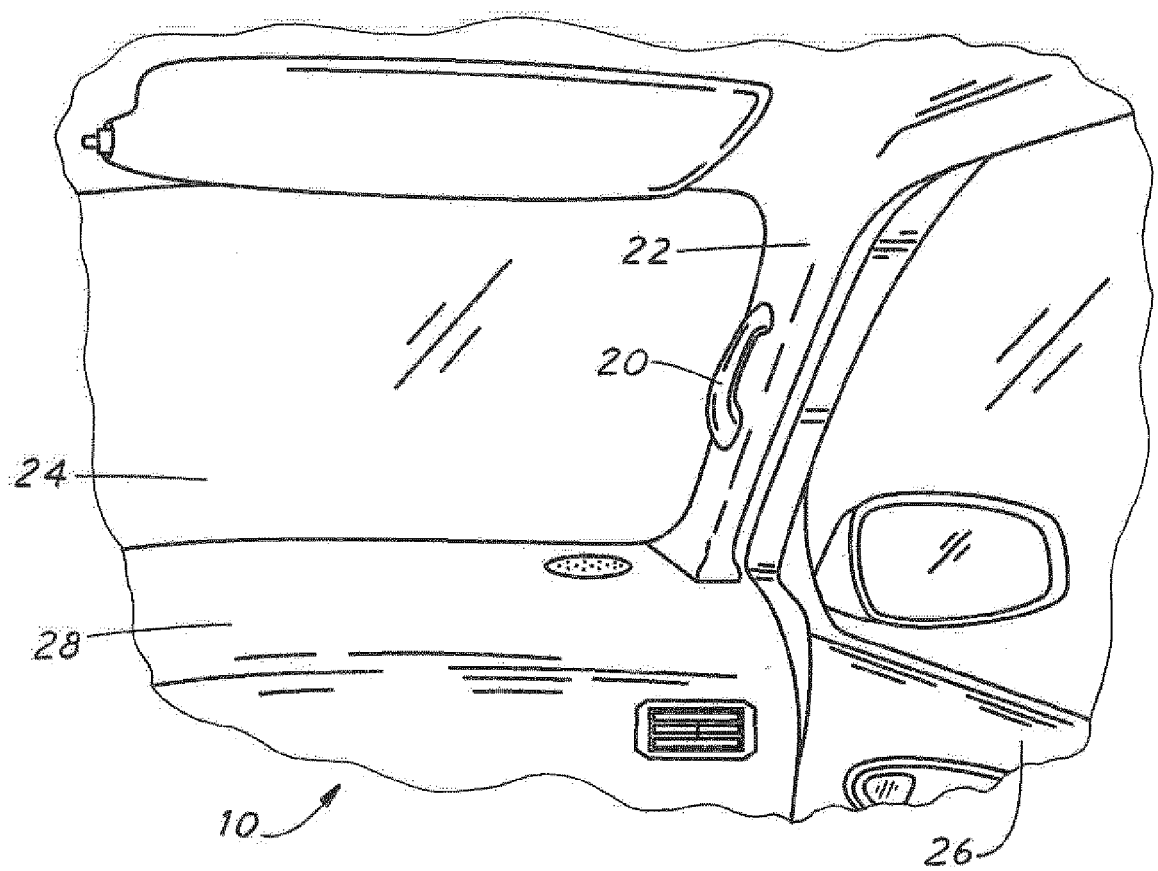
FIG. 1 is a schematic illustration of the interior of a vehicle illustrating a product made in accordance with the present invention.

FIG. 1 schematically illustrates the interior of an automobile or other vehicle, and is referred to generally by the reference numeral 10. The interior of the vehicle 10 includes a grab handle 20 which is positioned on the A-pillar 22 of the vehicle. The A-pillars are situated on the front of the vehicle between the windshield 24 and the door member 26. The dashboard 28 is also illustrated.

The present invention has particular use for grab handles, such as grab handle 20 shown in FIG. 1. As known today, grab handles are positioned at various locations in interiors of automobiles and other vehicles, including above the doors, on various pillars, on the interior of doors, and the like. The present invention, however, is not limited to grab handles, but can be utilized with respect to all shapes and types of handles as well as trim parts and other components used in automobiles and other vehicles. The invention can also be used with arm rests that contain integral grab handles or door closure handles.

It is also significant to point out that the present inventive process can be used with making lightweight plastic parts for industries other than the automobile and vehicle industries and thus is not limited in its application and scope to these industries.

Figure 2:
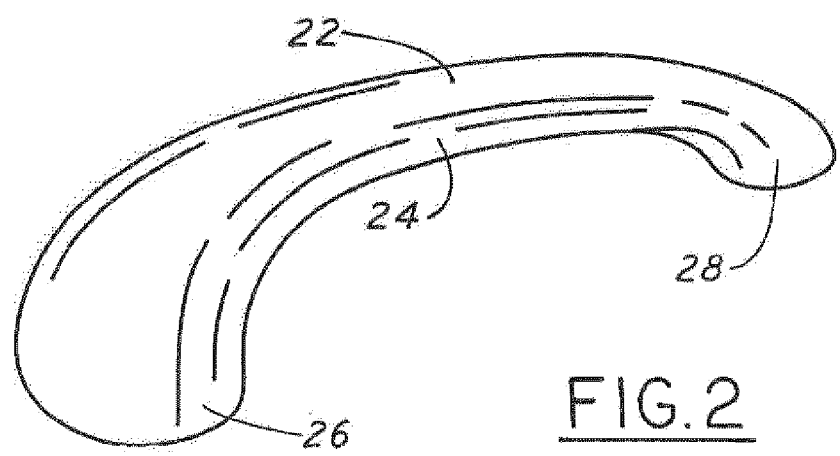
FIG. 2 is a perspective of a door closure handle or grab handle manufactured in accordance with the present invention.

FIG. 2 is a perspective view of a grab handle or door closure handle 22. As shown in FIG. 2 and as known in the art, handles such as handle 22 typically have a curved or U-shaped configuration with a central curved body portion 24 and two end members or portions 26 and 28. The curvature of the central or body portion 24 allows a person to grasp the handle, such as to assist in entering or exiting from a vehicle, or in opening and closing a door member or the like.

Preferably, the handle 22 is lightweight, but sufficiently durable and sturdy in order to perform its required function and allowing it to be grasped, pulled and pushed with considerable force as necessary. Since grab handles and door closure handles, such as handle 22, are provided in millions of automobiles and other vehicles on an annual basis, it is also important that the process used to manufacture the handles be as efficient, inexpensive, and fast as possible. At the same time, it is also necessary for the handles to be esthetically pleasing and free of any defects or deformities. It is also necessary that the handles be adapted to be secured or affixed securely and firmly to the vehicle pillar, door member, or the like.

A first embodiment of the inventive door handle or grab handle 30 in accordance with the present invention is shown in FIG. 3. The handle member 30 includes a central portion 32 and two end portions 34 and 36. The handle 30 is made of two different layers or types of material. This is also shown in the cross-sectional view in FIG. 5. The handle 30 has an interior core 40 made from a structural foam core material and an outer plastic shell or skin member 42.

The ends 34 and 36 of the handle are formed with elongated protrusions 35 and 37 which are shown in phantom in the form that they are provided or molded with the structural foam core 40. The plastic shell or skin 42 is preferably made from a polypropylene material and is over-molded on the foam core 40.

When the handle 30 is attached to pillar or door member panel 50, as shown in FIG. 3, the protrusions 35 and 37 are formed into the ends 38 and 39, respectively, in any conventional manner, such as by heat staking. This firmly affixes the door handle 30 onto the pillar or panel member 50.

In the manufacture of the handles 30, the core members 40 can be molded or formed in any conventional manner. Once molded, the cores are positioned on cooling racks, such as by use of a robot or the like, and then moved or transported into a plastic over-molding machine. The core members 40 are positioned in the mold cavity in the over-molding machine (not shown) and the polypropylene shell or skin 42 is then over-molded to form the component parts 30 as shown in FIG. 3.

In an alternative process, a two-shot substrate and over-molding tool can be utilized. Once the hot armatures (foam core from the tool) are cooled, they are moved or transported, again by a mechanical robot or the like, into the over-molding cavities of the tool at the same time that the finished over-molded parts are removed. In this manner, both armatures and finished parts will leave the tool, with an intermediate "out of tool" robotic cooling stage.

In another alternative, the present inventive handle members can be mold and over-molded in a direct two-shot transfer process. In this two-shot alternative, the injection molding machine could have two barrels, wherein material from the two barrels are injected at the same time into the mold but in different cavities. In one cavity, the foam cores are manufactured, while in the other cavity, the shell or skin member are injection molded over one of the finished core members.

The core member 40 could be made of any foam material, such as polypropylene with a foaming agent. The over-moulded shell or skin member can be either hard or soft plastic material, both of which are in common use today.

Preferably, the foam core includes the structural support for either heat staking or mechanical fastening to the pillar, door, panel or other substrate.

In a second embodiment of the present invention, a handle member 60 is provided, as shown in FIG. 4. The handle 60 has a central body portion 62 and two end members 64 and 66. The handle member 60 has a central foam core portion 70 and a thin, hard shell or skin 72 which is over-molded on top of the core. In this embodiment, the ends 64 and 66 of the handle member 60 are formed with blind holes or channels 74. In this manner, fastener members 80, such as bolts or screws, are used to secure the handle member 60 to a substrate member 80, such as a pillar member or door panel members.

Another embodiment of the present invention is shown in FIG. 6 and referred to generally by the reference numeral 90. The handle member 90 includes a central curved portion 92 and two end members 94 and 96. The handle member 90 includes a foamed central core member 100 and a thin plastic shell or skin 102. Again, the skin member can be either a hard or soft plastic material and is over-molded onto the foamed core member 100.

In the embodiment shown in FIG. 6, the structural foam core has a plurality of protrusion members 104A, 104B and 104C. Although three protrusion members are shown, it is understood that any number greater than two can be provided. Also in this embodiment, the protrusion members are formed with integral blind holes or channels 106A, 106B, and 106C which can be used, if desired, for screws, bolts, or other fasteners (not shown) in order to secure the handle member 90 to a panel 110, such as a vehicle pillar or door panel.

The protrusion members 104A, 104B and 104C are also used as locator pins or members so that the foam core portion 100 can be properly positioned in the over-molding cavity. In this manner, the over-molding process produces a plastic shell or skin which has uniform thickness and a similar appearance throughout its surface.

Figure 7:
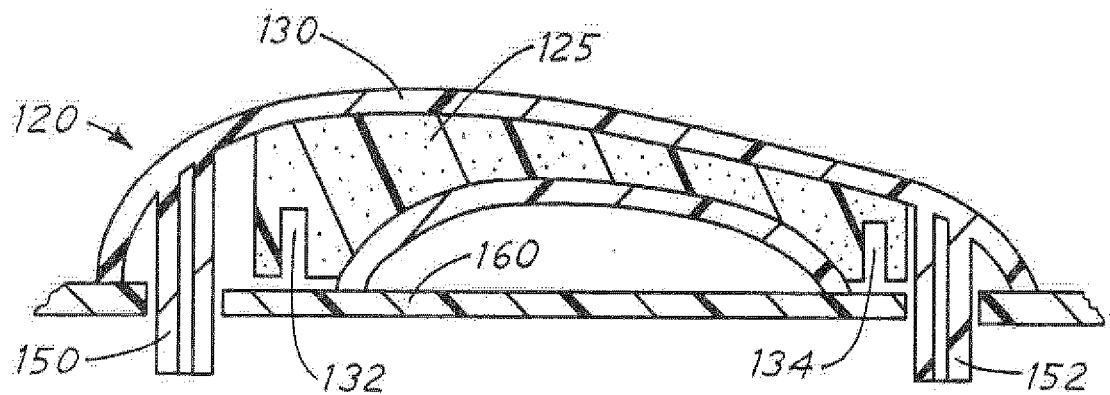
FIG. 7 illustrates still another embodiment of the present invention.
Figure 8:
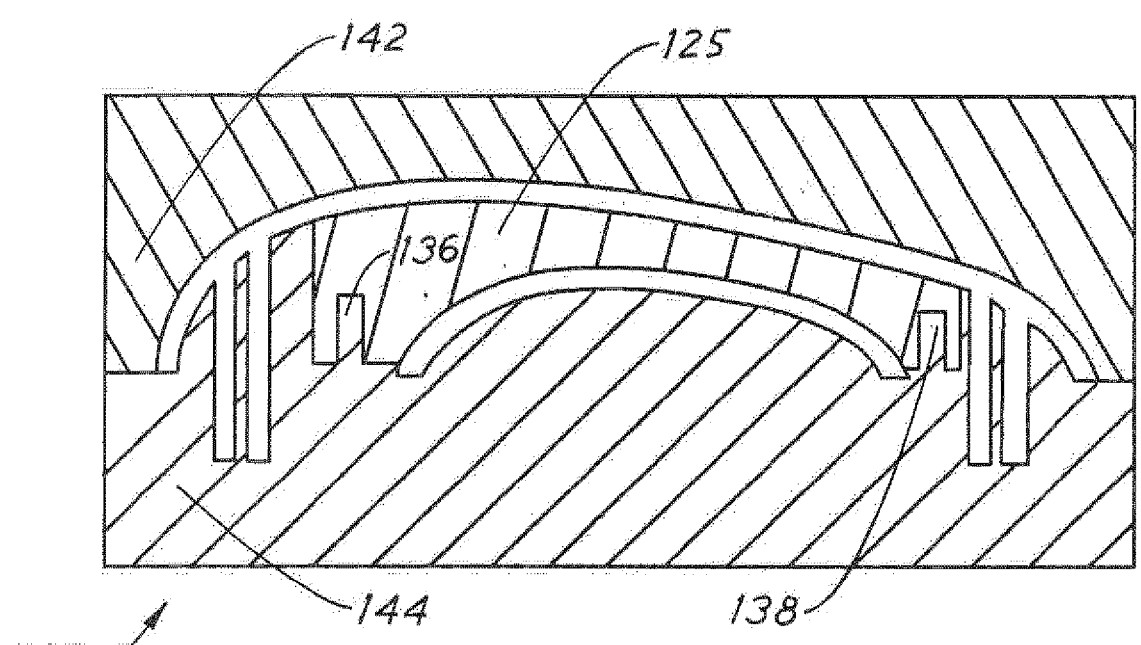
FIG. 8 schematically illustrates a mold for use in manufacturing the embodiment shown in FIG. 6.

FIG. 7 illustrates a third embodiment of the present invention, while FIG. 8 schematically illustrates a mold in which the embodiment is manufactured. In this embodiment of the invention, the handle member is referred to generally by the reference numeral 120 and consists of a central non-structural foamed core member 125 and a hard over-molded structural skin member 130. The core member 125 is formed with a plurality of openings 132 and 134, etc. which are used as locator holes for pin members 136 and 138, respectively, which are positioned in the over-molding mold cavity. The locator pins 136 and 138 are shown in the mold in FIG. 8. In this regard, the mold is referred to generally by the reference numeral 140 and consists of a cavity member 142 and a core mold member 144. As shown in FIG. 8, the non-structural foam core member 125 is positioned in the manner shown in the mold cavity 144, where it has been over-molded by the structural skin or shell. The handle member 120, as shown in FIG. 7, also includes a plurality of protrusion members 150 and 152, only two of which are shown. The protrusion members 150 and 152 are made from the same material as the structural shell or skin member 130 and are adapted to protrude through the substrate, pillar, or door panel member 160 on which the handle member 120 is mounted. The protrusion members 150 and 152 can be heat staked or otherwise deformed in order to securely hold the handle member 120 to the substrate member 160, or the handle member could ultimately be secured to the substrate by fastener members, such as screws or bolts (not shown).

As described above, the present invention provides handle members which have particular use as door closure handles and grab handles for automobiles and other vehicles. The products are made without the use of gas-assisted injection molding process and thus eliminate the expensive gas assist equipment, operating, and tooling costs. The present invention also eliminates the high scrap rate which is typical with gas-assist injection molding processes. The present invention also eliminates the high probability of failed gas assist applications with subsequent loss of tooling, program timing, and redesign expenses.

The present invention provides a product with a weight comparable to other plastic injection molded handle members. The invention provides a relatively simple, robust, and reliable process for making integral door pull handles, grab handles and the like. Conventional high pressure injection molding techniques and equipment can be used for molding both the foamed insert core and the over-molded shell or skin.

While the invention has been described in connection with one or more embodiments, it is to be understood that the specific mechanisms, processes and procedures which have been described are merely illustrative of the principles of the invention, numerous modifications may be made to the methods and apparatus described without departing from the spirit and scope of the invention as defined by the appended claims.

The invention claimed is:

1. A method for manufacture of a plastic handle member for attachment to a vehicle panel member, said handle member having two ends, said method comprising the steps of:

molding a foam core member, said core member having integrally formed attachment members protruding therefrom at each of said two ends, the attachment members adapted to be positioned in openings in a vehicle panel member and be secured thereto;

forming orientation holes in each of said ends of said foam core member;

positioned said core member on mating pin members in a second mold; and overmolding a plastic skin on said core member and covering the outer surface of said core member.

2. The method as described in claim 1 wherein said attachment members each have channel members therein for attaching said handle member to a vehicle panel member with mechanical fasteners.

3. The method as described in claim 1 wherein said attachment members are adapted to be attached to a vehicle panel member by heat staking.

4. The method as described in claim 1 wherein said plastic skin is made from a polypropylene material.

5. The method as described in claim 1 wherein said foam core member is made from a structural foam material.

6. The method as described in claim 1 wherein at least two attachment members are provided on at least one of said two ends.

7. A method for manufacture of a plastic handle member for attachment to a vehicle panel member, said handle member having two ends, said method comprising the steps of:

molding a foam core in a first mold cavity, said core member having two ends;

forming openings in said ends to assist in accurately positioning said molded foam core in a second mold cavity;

positioning said core member in a second mold cavity;

overmolding a plastic skin on said core member; and forming from said plastic skin material at least one protrusion on each of said two ends;

wherein said protrusions are adapted to be positioned in openings in a vehicle panel member.

* * * * *